UNITED STATES PATENT OFFICE.

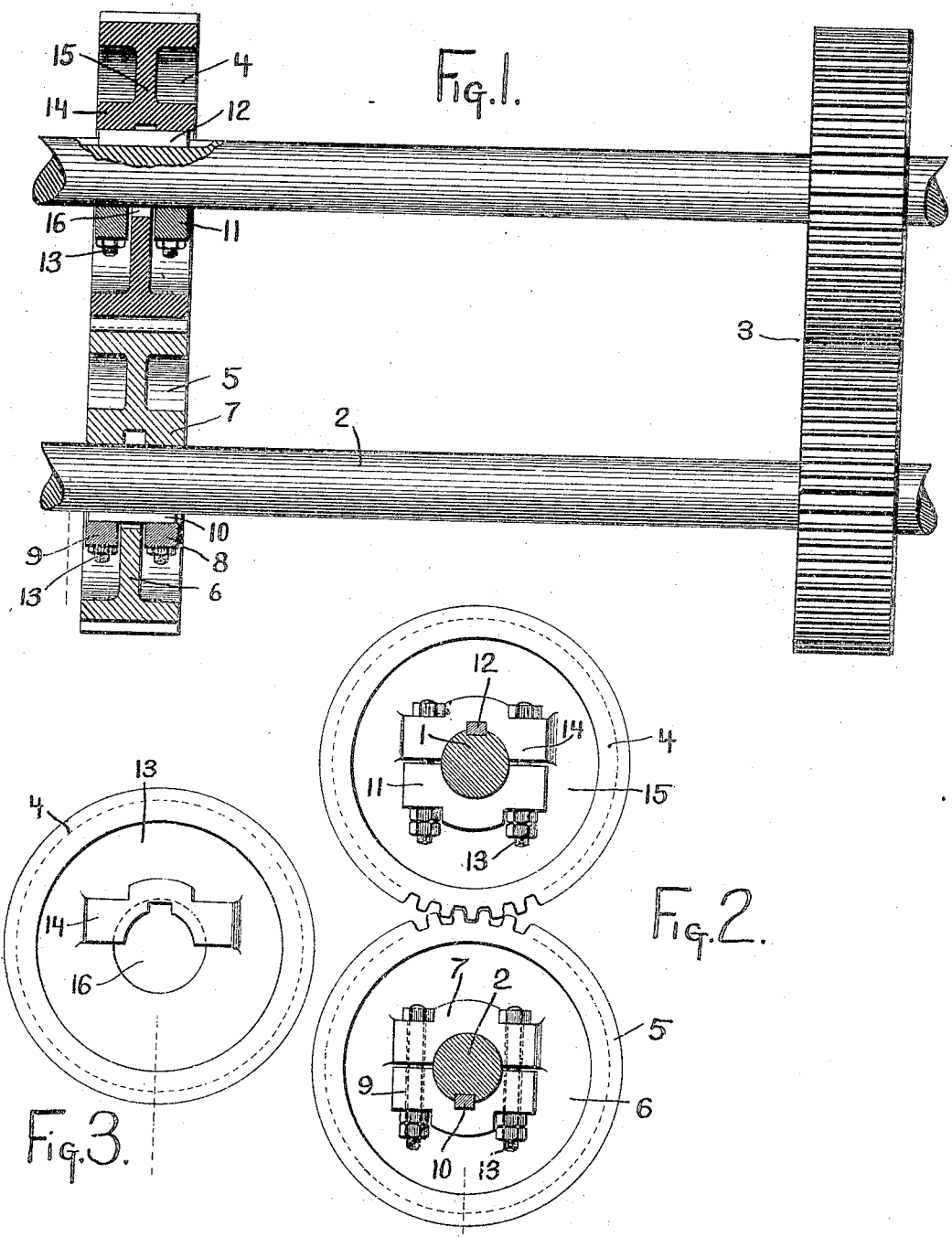

GEORGE C. HICKS, JR., OF CONNERSVILLE, INDIANA, ASSIGNOR TO THE P. H. & F. M. ROOTS COMPANY, OF CONNERSVILLE, INDIANA.

WHEEL-FASTENING.

No. 818,171. Specification of Letters Patent. Patented April 17, 1906.

Application filed November 17, 1905. Serial No. 287,786.

*To all whom it may concern:*

Be it known that I, GEORGE C. HICKS, Jr., a citizen of the United States, residing at Connersville, Fayette county, Indiana, (post-office address Connersville, Indiana,) have invented certain new and useful Improvements in Wheel-Fastenings, of which the following is a specification.

In fastening any wheel, be it belt-wheel or gear-wheel, to a shaft a firm union is of course desired, and with wheels of unsplit type the firm fastening often involves tight fits of such character as to render removal of the wheel rather difficult after the parts have become fouled with rust. Again, in many situations it is often desirable that a wheel in being firmly secured to its shaft be capable of angular adjustment thereon. For instance, in rotary pumps and blowers—say of the Roots type—the impellers, turning on axes parallel with each other, should have their contacting surfaces always in accurate relationship to each other, and the transmission of power between the two shafts is usually effected by toothed gearing. Very accurate construction is required in getting the gears into such relationship with each other as to harmonize with the proper interaction of the impellers, and difficulty is encountered in maintaining proper relationship of parts as wear takes place upon the lobes of the impellers and upon the teeth of the gears.

My invention pertains to a wheel-fastening designed to secure a peculiarly firm and convenient means of union between the wheel and shaft and capable also of permitting very delicate adjustment of the angular relationship of the wheel to its shaft.

My invention will be readily understood from the following description, taken in connection with the accompanying drawings, in which—

Figure 1 is a side elevation, part vertical section, of a pair of shafts geared together, the wheel system exemplifying my present invention; Fig. 2, a face view of the gears appearing at the left in Fig. 1, the shafts appearing in transverse vertical section; and Fig. 3, a face view of the upper left-hand wheel in Fig. 1 detached from it shaft and minus its clamp.

In the drawings, 1 indicates a shaft; 2, a second shaft parallel therewith; 3, a pair of gears connecting the shafts to cause them to turn in unison; 4, a second gear fast on the upper shaft; 5, a second gear fast on the lower shaft, the two gears 4 and 5 intermembering and forming a second pair of gears connecting the two shafts; 6, the web of gear 5; 7, the hub of this gear, projecting from each side of the web, this hub being a half-hub—that is to say, it extends around and fits upon only half of the circumference of the shaft; 8, a clamp disposed at one side of the web 6 and bored to fit the shaft opposite the hub 7, the clamp forming what might be called a "quarter-hub" for the wheel; 9, a similar clamp or quarter-hub on the opposite side of the web; 10, a key engaging keyways in the shaft and in the bores of the clamps 8 and 9; 11, similar clamps or quarter-hubs for the gear 4, which gear is similar to gear 5; 12, a key securing gear 4 to its shaft, this key engaging a keyway in the shaft and in the hub of the gear; 13, clamp-bolts engaging the gear-hubs and the clamps and serving to draw them together and firmly clamp the shaft between them; 14, the half-hub of gear 4; 15, the web of gear 4, and 16 the open center of the gears through which the shafts pass, the opening being of larger diameter than the shaft at the half opposite the half-hub formed upon the gear.

Consideration will first be given to the construction embodied in gear 4. The clamps or quarter-hubs 11 being absent or loosened, it is manifest that the gear may be easily placed upon its shaft, and then when the clamps or quarter-hubs are applied and tightened the wheel becomes secured to its shaft with a peculiar degree of firmness, the construction manifestly permitting the subsequent ready removal of the wheel without hindrance by rust or the like upon the shaft at the sides of the wheel. Thus far the device is seen to present simply a peculiarly firm and convenient means for securing a wheel to its shaft, and this construction would be available with any or all of the four gears illustrated or with any wheel requiring to be conveniently and firmly secured to its shaft; but in the situation illustrated in Fig. 1 the shafts are connected by two pairs of gears, and if the transmitting duty is to be equalized between the two pairs it follows that in original construction the gears must have a very accurate angular relationship to their shafts, and if the equalized transmission becomes impaired by future wear of parts it will be necessary to effect an angular readjustment at some point in the system. However conveniently and firmly the gear 4 may be secured to its shaft, it is to be observed that its manner of keying presents no special facilities for such angular adjustment. The pair of gears 3 may be taken as merely typifying any parts upon two shafts requiring to be put and maintained in certain relationship with their shafts; but turning to the gear 5 it is to be observed that that gear is not itself directly keyed to its shaft, the key being in the clamps. The clamp-bolts being loose, it follows that the gear might be turned a trifle upon its shaft. Therefore it being desired to adjust gear 5 angularly upon its shaft it is only requisite that the clamp-bolts upon one side of the shaft be loosened and the bolts upon the other side tightened. The clamps retain their angular relationship to the shaft; but the readjustment of the clamping has caused the angular shifting of the gear relative to the clamps and the shaft. Both of the gears 4 and 5 might, of course, be thus arranged for angular adjustment upon their shaft; but it is obvious that adjusting provision at one of the gears will be found practically efficient in most any system.

In the illustration, which is to be considered as merely exemplifying, the wheels have been illustrated as toothed gears, and their webs have been illustrated as webs in fact—that is to say, as solid plate-like central structures for the wheels, the hub portions projecting sidewise from the plane of the web, but not extending beyond the faces of the gears. The plate or web form and the matter of hub projection are non-essential. It is to be presumed always that a wheel has a hub portion to engage its shaft and that it has a rim portion and that it has an intermediate portion in web form or otherwise connecting the rim with the hub. I will employ the term "wheel-body" as meaning such intermediate portion, whatever its specific form may be.

I claim—

1. In a wheel-fastening, the combination, substantially as set forth, of a wheel-body provided with a perforation to freely admit a shaft, said perforation presenting a half-bore to fit the shaft, a hub portion independent of the wheel-body and having a half-bore adapted to engage the shaft opposite its engagement by the half-bore of the wheel-body, and clamping-bolts engaging the wheel-body and independent hub portions at the opposite side of the bore and adapted to draw the independent hub portion toward the wheel-body, said independent hub portion having a keyway adapted to receive a key engaging the shaft, whereby said independent hub portion is adapted for fixed angular relationship with the shaft while the wheel-body may be angularly adjusted relative thereto by means of the clamping-bolts.

2. The combination, substantially as set forth, of a shaft, a wheel secured thereto, a second shaft parallel with the first one, a wheel disposed upon the second shaft and engaging the first wheel, said second wheel having a wheel-body perforated to freely admit its shaft and having a half-bore fitting its shaft and adapted for angular movement on the shaft, a hub portion for the second wheel, independent of the wheel-body and having a half-bore to engage the shaft, clamping-bolts uniting said independent hub portion to the wheel-body of its wheel and disposed upon opposite sides of the shaft and serving to angularly adjust said independent hub portion relative to its wheel-body, and a key engaging said independent hub portion and its shaft, whereby the independent hub portion has fixed angular relation to the shaft while the wheel-body may be angularly adjusted upon the shaft by means of the clamping-bolts.

3. In a wheel-fastening, the combination, substantially as set forth, of a wheel-body perforated to freely admit a shaft and having a hub part rigidly formed with it and projecting from its sides, said hub part having a half-bore adapted to fit a shaft, clamps or quarter-hubs disposed upon each side of the wheel-body opposite the side projections of its hub part and having half-bores to fit the shaft and having keyways to receive a key to hold them against angular displacement on the shaft, and clamping-bolts disposed at opposite sides of the bore and adapted to draw the quarter-hubs forcibly toward the hub part of the wheel-body and to adjust the angular relation between them.

GEORGE C. HICKS, Jr.

Witnesses:
E. D. JOHNSTON,
J. M. SHADE.